(12) United States Patent
Matsuo et al.

(10) Patent No.: US 7,811,960 B2
(45) Date of Patent: Oct. 12, 2010

(54) CATALYST FOR EXHAUST GAS PURIFICATION AND EXHAUST GAS PURIFICATION APPARATUS

(75) Inventors: Yuichi Matsuo, Saitama (JP); Kazunori Kiguchi, Saitama (JP); Norihiko Suzuki, Saitama (JP); Atsushi Furukawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 118 days.

(21) Appl. No.: 11/663,464

(22) PCT Filed: Sep. 24, 2004

(86) PCT No.: PCT/JP2004/014465

§ 371 (c)(1),
(2), (4) Date: Mar. 22, 2007

(87) PCT Pub. No.: WO2006/033168

PCT Pub. Date: Mar. 30, 2006

(65) Prior Publication Data

US 2008/0254977 A1   Oct. 16, 2008

(51) Int. Cl.
*B01J 23/00* (2006.01)
*B01J 23/10* (2006.01)
(52) U.S. Cl. .................................. 502/303; 502/325
(58) Field of Classification Search .............. 502/303, 502/525, 325
See application file for complete search history.

(56) References Cited

U.S. PATENT DOCUMENTS

| 4,151,123 A * | 4/1979 | McCann, III ............... 502/303 |
| 4,738,946 A | 4/1988 | Yamashita et al. |
| 4,921,829 A | 5/1990 | Ozawa et al. |
| 7,205,257 B2 * | 4/2007 | Tanaka et al. ............... 502/327 |

FOREIGN PATENT DOCUMENTS

| CA | 2 534 278 A1 | 2/2005 |
| CA | 2 537 022 A1 | 3/2005 |
| EP | 1666143 A1 | 6/2006 |
| JP | 51-123794 A | 10/1976 |

(Continued)

OTHER PUBLICATIONS

TheFreeDictionary.com. "intervene." verb, 4. Farlex, Inc. 2009.*

(Continued)

*Primary Examiner*—Jessica L Ward
*Assistant Examiner*—Alexander Polyansky
(74) *Attorney, Agent, or Firm*—Arent Fox LLP

(57) ABSTRACT

A catalyst for exhaust gas purification is provided that can not only efficiently and simultaneously purify nitrogen oxides, hydrocarbons and carbon monoxide in exhaust gas emitted from internal combustion engines such as those of automobiles even at lower temperatures, but also exhibits higher durability. The coexistence of a complex oxide that includes a rare earth element and palladium, a rare earth oxide, and a perovskite-type complex oxide that is expressed by the general formula $LnAlO_3$, in which Ln is a rare earth element, may provide a catalyst that not only efficiently purifies the exhaust gas emitted from internal combustion engines such as those of automobiles even at lower temperatures, but also exhibits higher durability.

6 Claims, 7 Drawing Sheets

FOREIGN PATENT DOCUMENTS

| | | | |
|---|---|---|---|
| JP | 61-209045 | A | 9/1986 |
| JP | 62-282642 | A | 12/1987 |
| JP | 64-043347 | A | 2/1989 |
| JP | 01-168343 | A | 7/1989 |
| JP | 03-068451 | A | 3/1991 |
| JP | 04-027433 | A | 1/1992 |
| JP | 04-341343 | A | 11/1992 |
| JP | 06-100319 | A | 4/1994 |
| JP | 07-088372 | A | 4/1995 |
| JP | 10-277393 | A | 10/1998 |
| JP | 2003-175337 | A | 6/2003 |
| JP | 2004-041866 | A | 2/2004 |
| WO | WO-00/03947 | A1 | 1/2000 |

OTHER PUBLICATIONS

Zhaolong Zhang, et al. "Comparative Study of Carbon Dioxide Reforming of Methane to Synthesis Gas Over Ni/$La_2O_3$ and Conventional Nickel-Based Catalysts", J. Phys. Chem., vol. 100, No. 2, 1996, pp. 744-754.

Ginya Adachi, et al., "17.6 Novel Synthesis Methods of Complex Oxides", Science of Rare Earth, Kagaku-Dojin Publishing Co., p. 564.

EP Supplementary European Search Report mailed Dec. 28, 2009 in EP Application No. 04773552.7.

Suhonen, S., et al., "Characterization of alumina supported Pd catalysts modified by rare earth oxides using X-ray photoelectron spectroscopy and X-ray differentiation: enhanced thermal stability of PdO in Nd/Pd catalysts"; Applied Catalysis A: General, Elsevier Science B.V., vol. 207, No. 1-2, Feb. 1, 2001, pp. 113-120, XP002557406.

Zhang Hua-Min et al., "Preparation of peroskite-type oxides with large surface area by citrate process", Chemistry Letters, Chemical Society of Japan, Tokyo, JP, Jan. 1, 1987, pp. 665-668, XP002508315, ISSN: 0366-7022.

\* cited by examiner

CATALYST FOR EXHAUST GAS PURIFICATION AND EXHAUST GAS PURIFICATION APPARATUS

CROSS-REFERENCE TO RELATED APPLICATION

This application is a National Stage entry of International Application No. PCT/JP2004/014465, filed Sep. 24, 2004, the entire specification claims and drawings of which are incorporated herewith by reference.

TECHNICAL FIELD

The present invention relates to catalysts that not only efficiently and simultaneously purify nitrogen oxides (NOx), hydrocarbons (HC) and carbon monoxide (CO) in exhaust gases emitted from internal combustion engines such as those of automobiles at lower temperatures, but also exhibit higher durability.

BACKGROUND ART

It has been publicly known in the art that catalysts containing precious metals such as Pt, Rh, Pd and Ir may efficiently purify exhaust gases. These precious metals are typically supported on $Al_2O_3$ having high surface area. The precious metals are supported on $Al_2O_3$ in a highly dispersed state, which is optimal for catalytic performance. Specifically, one precious metal supported on $Al_2O_3$, or combinations of a plurality of precious metals supported on $Al_2O_3$, for example, are utilized as catalysts for exhaust gas purification.

Incidentally, the precious metals tend to aggregate, reducing the number of active sites, due to extended exposure to high-temperature under severe conditions such as those of automobiles, thereby significantly decreasing their activity and effectiveness in exhaust gas purification. As such, catalysts with high precious metal content are utilized in order to purify automobile exhaust gases, which requires extremely high durability. However, catalysts with high precious metal content are remarkably expensive and, therefore, are undesirable from the viewpoint of developing inexpensive and highly active catalysts.

To counter this, use of precious metals in a form of complex oxide containing the precious metals and other elements has been proposed so as to avoid the agglomeration of the precious metals. With respect to Pd in particular, technologies for complex oxides of Pd and rare earth or alkaline metal elements have been disclosed (see Japanese Unexamined Patent Publication Nos. 61-209045, 01-43347, 04-27433, 04-341343 and 07-88372).

In addition, Pd supported on catalyst carriers such as $Al_2O_3$ exists in the state of PdO, which has high activity for exhaust gas purification; however, it changes into Pd metal upon extended exposure to high-temperatures of 900 degrees C. or higher; since $Al_2O_3$ is a stable compound and is far from interaction with the Pd supported thereon, the decomposition into Pd cannot be suppressed. Therefore, conventional catalysts having precious metals supported on carriers such as $Al_2O_3$ are inadequate with respect to their durability.

On the other hand, perovskite-type complex oxides have been developed in recent years for catalysts to purify exhaust gases. The perovskite-type complex oxides may be various combinations of elements, thus exhibiting an extremely wide variety of properties. It is publicly known that the precious metals supported on such complex oxides are significantly affected by the wide variety of properties of the complex oxides and that the properties of the precious metals change considerably.

A technology on the basis of these properties has been disclosed, where a portion of the precious metal content is incorporated into a crystal structure of perovskite-type (see Japanese Unexamined Patent Publication No. 06-100319). It is therein described that the precious metal incorporated into the crystal lattice may enhance the catalytic activity of the precious metal; this is because the precious metal particles are micronized and highly dispersed, and also due to lattice defects, which contribute to the catalytic activity, being generated moderately.

A catalyst for exhaust gas purification is also proposed, where A-site defect perovskite is used as a carrier in place of the conventionally used $Al_2O_3$ (see Japanese Unexamined Patent Publication No. 2003-175337). The catalyst for exhaust gas purification may prevent the reduction of PdO, which is an active species in the NO reduction reaction, into Pd, which has lower activity.

A technology by use of perovskite-type complex oxides has also been disclosed, where the durability of catalysts for exhaust gas purification is enhanced (see Japanese Unexamined Patent Publication No. 2004-41866). The durability of catalysts for exhaust gas purification may be enhanced by way of solid-dissolving Pd into a perovskite-type complex oxide, thereby suppressing Pd agglomeration.

However, the perovskite-type complex oxides are very highly crystalline complex oxides, making it impossible for the Pd inside the complex oxides to contribute to reaction. Therefore, the Pd is far from fully exhibiting its exhaust gas-purifying function, and its catalytic activity in purifying exhaust gases is not high.

A technology concerning a heat-resistant catalyst for exhaust gas purification has also been disclosed (see Japanese Unexamined Patent Publication No. 10-277393). The catalyst for exhaust gas purification has both a Pd complex oxide, containing at least one of the rare earth metals and alkaline earth metals, and a complex oxide containing at least one of the transition metals in a solid-solution or mixed condition, and exhibits higher heat resistance.

However, Pd in a solid-solution of the complex oxide containing at least one of the rare earth metals cannot contribute to reaction. Therefore, the Pd is far from fully exhibiting its exhaust gas-purifying function, and its catalytic activity in purifying exhaust gases is not high.

The present invention has been made in view of the problems described above; it is an object of the present invention to provide a catalyst for exhaust gas purification that can not only efficiently and simultaneously purify nitrogen oxides (NOx), hydrocarbons (HC) and carbon monoxide (CO) in exhaust gas emitted from internal combustion engines such as those of automobiles at lower temperatures, but can also exhibit higher durability.

DISCLOSURE OF THE INVENTION

The present inventors et al. have investigated to solve the problems described above, and have consequently found that the coexistence of a complex oxide that includes a rare earth element and palladium, a rare earth oxide, and a perovskite-type complex oxide that is expressed by the general formula $LnAlO_3$ (Ln: rare earth element) may not only provide a catalyst that efficiently and simultaneously purifies exhaust gases such as those of automobiles, but also exhibits excellent durability, and thus the present invention has been completed. More specifically, the present invention is as follows.

In a first aspect of a catalyst for exhaust gas purification, suited to purify nitrogen oxides, hydrocarbons and carbon monoxide in the exhaust gas, in which a complex oxide, a rare earth oxide and a perovskite-type complex oxide coexist in the catalyst, the complex oxide comprises a rare earth element and palladium, and the perovskite-type complex oxide is expressed by the general formula $LnAlO_3$ (Ln: rare earth element).

The catalyst for exhaust gas purification according to the present invention is characterized in that the complex oxide that contains a rare earth element and palladium (hereinafter referred to as "Ln-Pd complex oxide"), the rare earth oxide, and the perovskite-type complex oxide, expressed by the general formula $LnAlO_3$, coexist in the catalyst. The coexistence of the Ln-Pd complex oxide, the rare earth oxide, and the $LnAlO_3$ in the catalyst for exhaust gas purification according to the present invention may exert the following various effects. Firstly, the Ln-Pd complex oxide formed from Pd may achieve a highly dispersed state of Pd. Secondly, interaction with $LnAlO_3$ may make it possible to maintain the oxidation state $Pd^{2+}$ in the Ln-Pd complex oxide, which is more active and better suited for exhaust gas purification. Thirdly, the existence of three oxide phases may suppress coagulation of the respective oxides, which may suppress the Pd coagulation under extended exposure to high-temperatures and maintain Pd at a highly dispersed state. Fourthly, complexation of rare earth elements with Pd in such forms as $La_2PdO_7$, $La_2PdO_4$ and $La_2PdO_5$ may suppress decomposition of the Ln-Pd complex oxide into Pd metal upon extended exposure to high-temperatures. Accordingly, the present invention may provide a catalyst for exhaust gas purification that efficiently and simultaneously purifies exhaust gases, such as those of automobiles, even at lower temperatures and also exhibit higher durability.

In a second aspect of the catalyst for exhaust gas purification as described in the first aspect, the crystal system of the perovskite-type complex oxide expressed by the general formula is trigonal or rhombohedral.

The crystal system of the perovskite-type complex oxide expressed by the general formula $LnAlO_3$, utilized in the catalyst for exhaust gas purification according to the second aspect, is trigonal or rhombohedral. The ideal crystal system of perovskite-type complex oxides is typically a cubic system, which transforms into a monoclinic, rhombic, tetragonal, trigonal, rhombohedral system or the like depending on the species of metals. Among perovskite-type complex oxides expressed by the general formula $LnAlO_3$, for example, $GdAlO_3$ etc. are monoclinic, whereas $LaAlO_3$, $NdAlO_3$ etc. are trigonal or rhombohedral. As such, the catalyst for exhaust gas purification, containing perovskite-type complex oxides of which the crystal system is trigonal or rhombohedral, is favorable due to its remarkably high activity for exhaust gas purification and excellent durability.

The reason why the perovskite-type complex oxides, of which the crystal system is trigonal or rhombohedral, exhibit high activity for exhaust gas purification and excellent durability is believed to be as follows. These crystal systems are ones having significant distortion in their crystal, thus exhibiting electrically unstable properties. A Ln-Pd complex oxide adjacent to $LnAlO_3$ has relatively large electrical fluctuation compared to an isolated Ln-Pd complex oxide due to the existence of electrically unstable $LnAlO_3$. Therefore, most of the Pd among those existing at the surface of Ln-Pd complex oxide is present in the oxidation state $Pd^{2+}$. It has been found that Pd is present in two oxidation states, $Pd^{2+}$ and $Pd^0$ (metal state); among these states, $Pd^{2+}$ is more active with respect to exhaust gas purification. That is, Pd in the Ln-Pd complex oxide, utilized in the catalyst for exhaust gas purification according to the second aspect, is in the appropriate oxidation state for exhaust gas purification. Therefore, the catalyst for exhaust gas purification according to the second aspect may exhibit significantly high activity for exhaust gas purification and excellent durability.

In a third aspect of the catalyst for exhaust gas purification as described in the first aspect or second aspect of the present invention, the complex oxide comprising a rare earth element and palladium, the rare earth oxide, and the perovskite-type complex oxide expressed by the general formula, are each one produced through a polymer of an organic acid complex.

The Ln-Pd complex oxide, the rare earth oxide, and $LnAlO_3$ utilized in the catalyst for exhaust gas purification according to the third aspect are each produced through a polymer of an organic acid complex. This production process through a polymer of an organic acid complex may produce catalysts for exhaust gas purification with high activity and excellent durability. For example, the Ln-Pd complex oxide and the rare earth oxide may each be produced by way of adding an organic acid to an aqueous solution containing a salt of rare earth element and a salt of Pd, and heating to a high temperature. $LnAlO_3$ may also be prepared using a salt of Al in place of the salt of Pd.

In a fourth aspect of the catalyst for exhaust gas purification as described in the third aspect, the organic acid is a carboxylic acid that has a hydroxyl group or a mercapto group and a carbon number of no less than 1 and no more than 20.

The organic acid utilized for producing the catalyst for exhaust gas purification according to the fourth aspect is a carboxylic acid that has a hydroxyl group or a mercapto group and a carbon number of no less than 1 and no more than 20. The carboxylic acid may be monocarboxylic acid, dicarboxylic acid, tricarboxylic acid or the like. Specific examples of the organic acid include lactic acid, tartaric acid, malic acid, citric acid, salicylic acid, mandelic acid, tropic acid, benzilic acid, glycolic acid, glyceric acid, hydroxyisobutyric acid, hydroxyvaleric acid, 3-hydroxypropionic acid, dimethylolpropionic acid, dimethylolbutanoic acid, p-hydroxybenzoic acid, ricinoleic acid, hydroxystearic acid, coumalic acid, coumarinic acid, alpha,beta-dihydroxyhexahydrophthalic acid, ascorbic acid, mercaptosuccinic acid, 2-mercaptopropionic acid, 3-mercaptobutanoic acid, 2-mercaptobutanoic acid, 2-mercaptoisobutanoic acid, 4-mercaptovaleric acid and 3-mercaptovaleric acid. The catalyst for exhaust gas purification, produced using these organic acids, may exhibit still higher activity for exhaust gas purification and better durability.

In a fifth aspect of the catalyst for exhaust gas purification as described in any one of aspects one to four of the present invention, the mole ratio of the rare earth element in the rare earth oxide to palladium in the complex oxide comprising a rare earth element and palladium (rare earth element/palladium) is more than 0 and no more than 42.

The mole ratio of the rare earth element in the rare earth oxide to palladium in the Ln-Pd complex oxide is more than 0 and no more than 42 in the catalyst for exhaust gas purification as described in the fifth aspect of the present invention; that is, the ratio Y/X satisfies the relation $0<Y/X\leq 42$, in which X is the mole number of palladium in the Ln-Pd complex oxide and Y is the mole number of the rare earth element in the rare earth oxide.

The catalyst for exhaust gas purification in the fifth aspect of the present invention that satisfies the relation may be more active for exhaust gas purification and more durable. In cases where the mole ratio of the rare earth element to the palladium is 0, the activity for exhaust gas purification is inadequate, and cases where the ratio is above 42 are undesirable since the Ln-Pd complex oxide is likely to be buried within the rare earth oxide.

In a sixth aspect of the catalyst for exhaust gas purification as described in any one of aspects one to five in the present invention, the complex oxide comprising a rare earth element and palladium as well as the rare earth oxide are supported on the perovskite-type complex oxide expressed by the general formula.

The Ln-Pd complex oxide and the rare earth oxide are supported in a mixed condition on the $LnAlO_3$ in the catalyst for exhaust gas purification as described in the sixth aspect. Even in cases where the Ln-Pd complex oxide and the rare earth oxide exist in a mixed condition without being supported, the effects described above may be attained; meanwhile, the supported condition of the catalyst for exhaust gas purification as described in the sixth aspect may result in higher activity and better durability.

In a seventh aspect of an apparatus for exhaust gas purification comprises a catalyst for exhaust gas purification according to any one of aspects one to six of the present invention.

The apparatus for exhaust gas purification has a catalyst for exhaust gas purification according to any one of aspects one to six of the present invention. The apparatus for exhaust gas purification may be anything, without being defined in terms of other constitutions, as long as it includes a catalyst for exhaust gas purification according to any one of aspects one to six of the present invention; for example, it may be exemplified by apparatuses for exhaust gas purification mounted on vehicles. The apparatus for exhaust gas purification may efficiently purify the exhaust gases of automobiles etc. even at lower temperatures and also exhibit higher durability, and thus be operable under continuous running.

PREFERRED MODE FOR CARRYING OUT THE INVENTION

The embodiments of the present invention are explained with reference to drawings in the following.

A Ln-Pd complex oxide, a rare earth oxide, and a perovskite-type complex oxide expressed by the general formula $LnAlO_3$ are used as the catalyst for exhaust gas purification according to the present invention. It is not necessary for the rare earth elements contained in the Ln-Pd complex oxide, the rare earth oxide, and the $LnAlO_3$, respectively, to be identical; they rather may be a combination of a plurality of rare earth elements. These oxides are explained below.

Perovskite-type Complex Oxide ($LnAlO_3$)

A perovskite-type complex oxide is used for the catalyst for exhaust gas purification according to the present invention, in which its general formula is $LnAlO_3$ and its B site is Al. The "perovskite" as used herein indicates a crystal structure observed in complex oxides having a chemical formula $RMX_3$. Ln in the general formula indicates a rare earth element, preferably La, Ce, Pr, Nd, Pm or Sm in particular. The perovskite-type complex oxide used in the present invention has a trigonal or rhombohedral crystal system, and is thus an electrically unstable substance.

Figure 1:
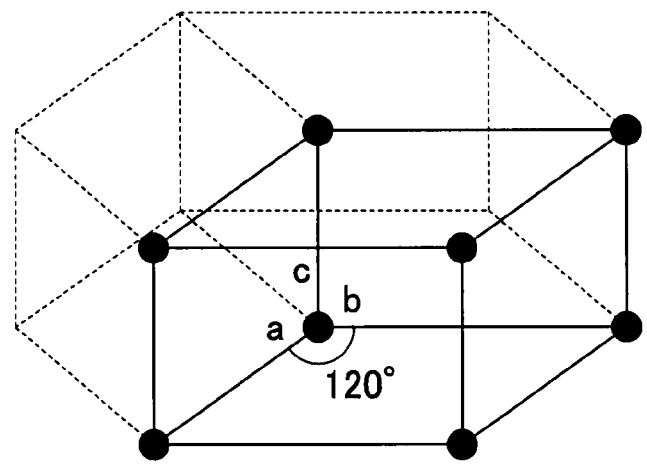
FIG. 1 is a drawing that shows a trigonal structure.
Figure 2:
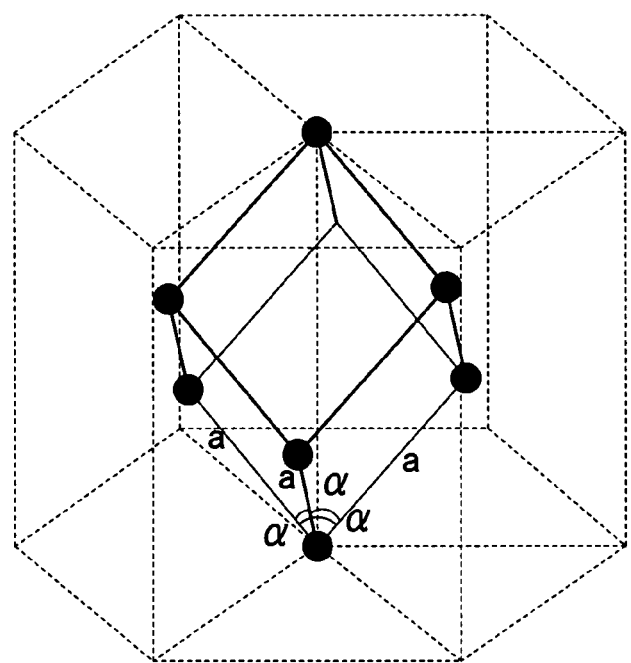
FIG. 2 is a drawing that shows a rhombohedral structure.

The trigonal system is a crystal system, as shown in FIG. 1, of which the lattice is deformed from ideal unit lattice toward the direction of the c-axis and the angle between the a-axis and the b-axis is 120 degrees; that is, the crystal system is significantly deformed from ideal cubic perovskite, and thus the state of electrons existing between constitutional atoms is remarkably unstable. On the other hand, the rhombohedral system is a crystal system, as shown in FIG. 2, which corresponds to a trigonal system with different basic axes and the structure itself is the same as that of the trigonal system.

Al—O bonds typically have a strong covalent bonding property; therefore, it is believed that the bond causes some electrical bias in perovskite crystals that have a strong ionic bonding property. Accordingly, the perovskite-type complex oxides expressed by the general formula $LnAlO_3$ are less electrically stable than $LaFeO_3$, well-known catalysts for exhaust gas purification.

Figure 3:
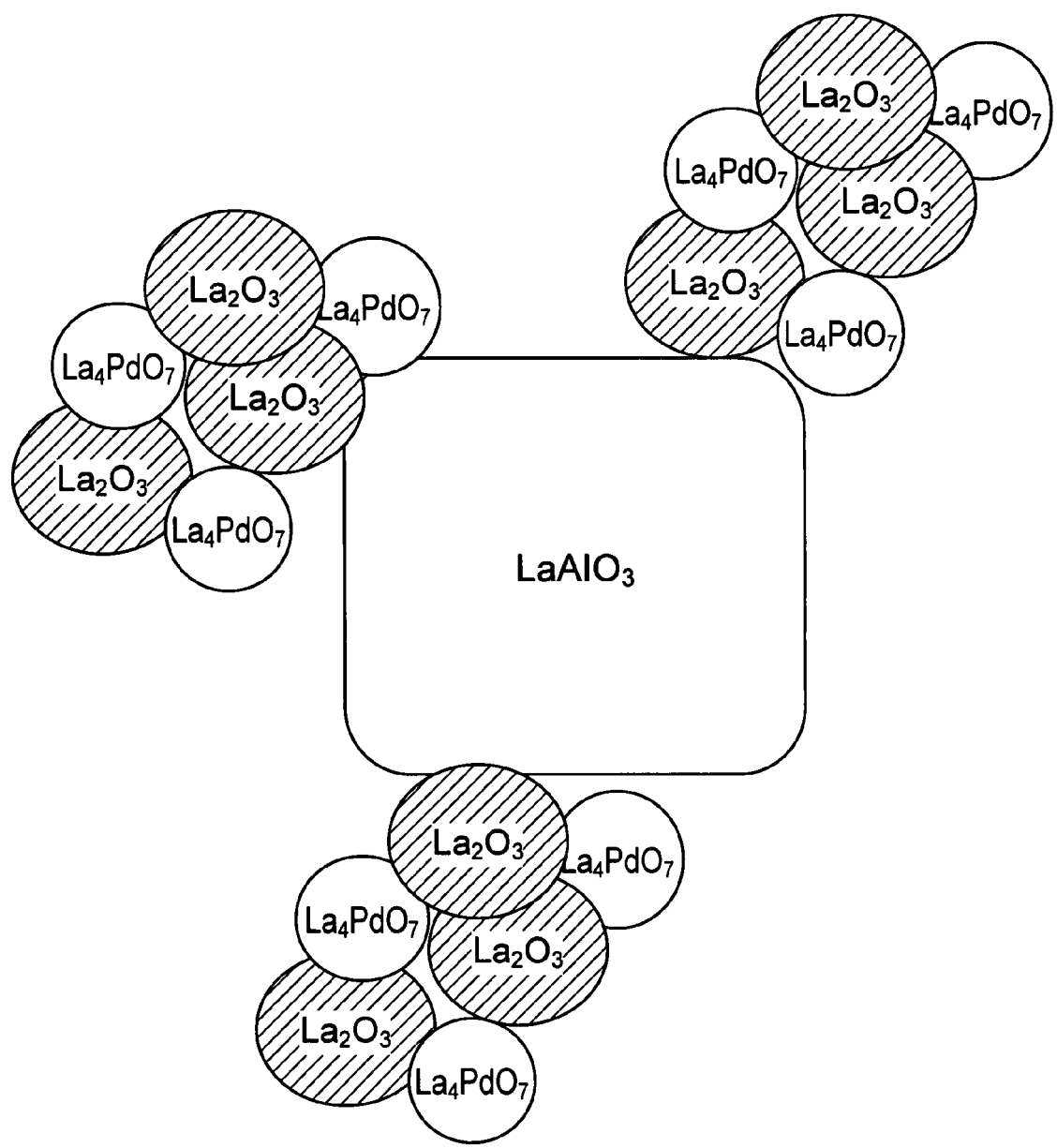
FIG. 3 is an illustrative drawing of the catalyst for exhaust gas purification according to the present invention.
Figure 4:
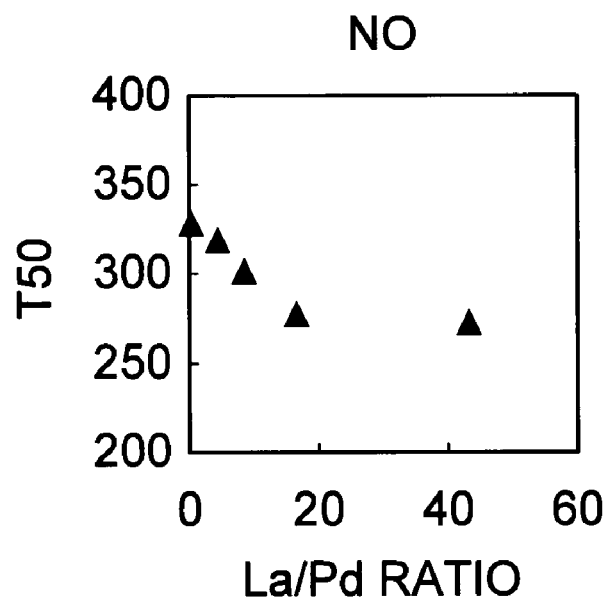
FIG. 4 is a graph that shows a relation between the ratio of La/Pd and temperature to purify 50% of NO.
Figure 5:
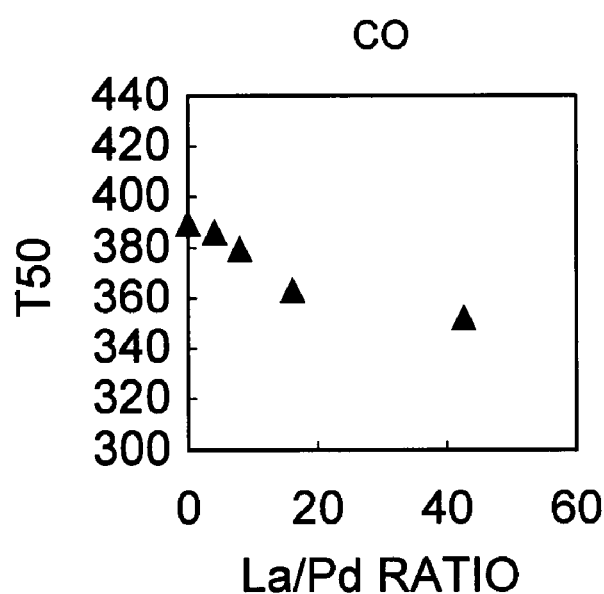
FIG. 5 is a graph that shows a relation between the ratio of La/Pd and temperature to purify 50% of CO.
Figure 6:
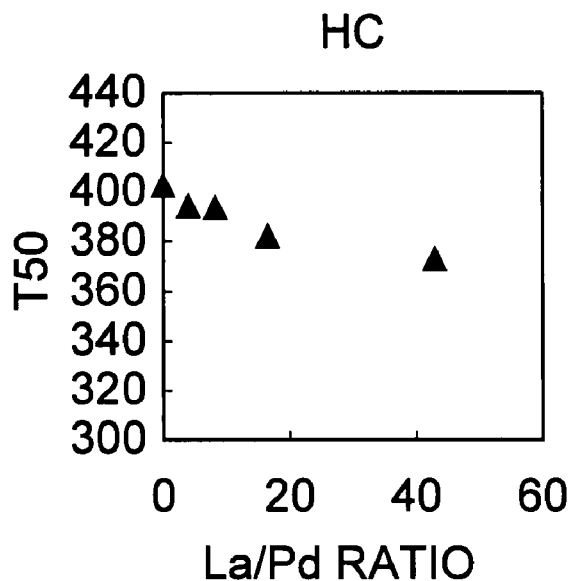
FIG. 6 is a graph that shows a relation between the ratio of La/Pd and temperature to purify 50% of HC.
Figure 7:
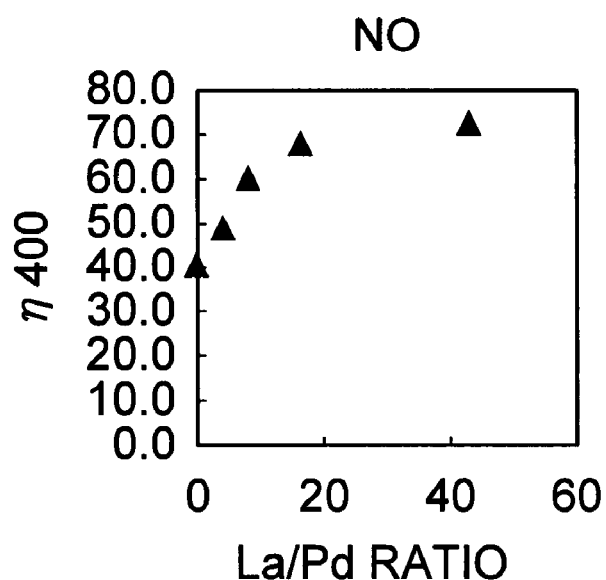
FIG. 7 is a graph that shows a relation between the ratio of La/Pd and NO purification rate at 400 degrees C.
Figure 8:
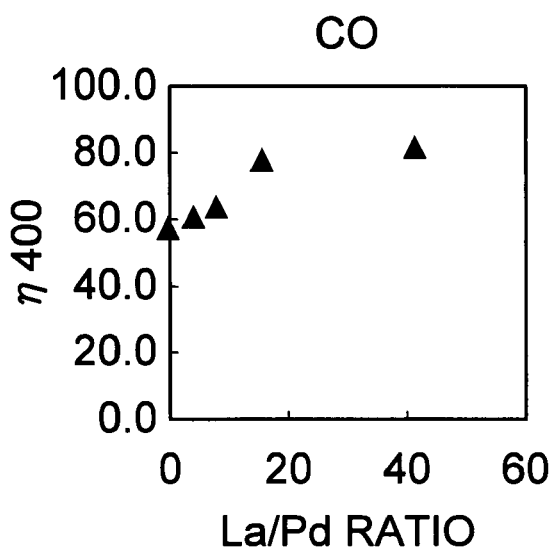
FIG. 8 is a graph that shows a relation between the ratio of La/Pd and CO purification rate at 400 degrees C.
Figure 9:
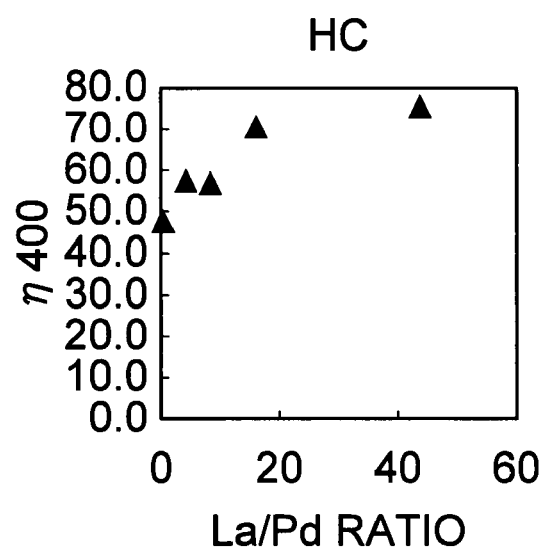
FIG. 9 is a graph that shows a relation between the ratio of La/Pd and HC purification rate at 400 degrees C.

In the catalyst for exhaust gas purification according to the present invention, the Ln-Pd complex oxide described later and the rare earth oxide coexist adjacent to the $LnAlO_3$ having these properties (see FIG. 3); alternatively, the Ln-Pd complex oxide and the rare earth oxide are supported on the $LnAlO_3$. Then, the Ln-Pd complex oxide, adjacent to the $LnAlO_3$, exhibits relatively large electrical fluctuation compared to when isolated due to the existence of electrically unstable $LnAlO_3$. Therefore, most Pd, among those supported on the surface of Ln-Pd complex oxide, exists in the oxidation state $Pd^{2+}$. It has been found that Pd adopts two oxidation states, $Pd^{2+}$ and $Pd^0$ (metal state); among these states, $Pd^{2+}$ is more active with respect to exhaust gas purification. That is, Pd in the Ln-Pd complex oxide, utilized in the catalyst for exhaust gas purification according to the present invention, is of the preferable oxidation state for exhaust gas purification.

Furthermore, in the catalyst for exhaust gas purification according to the present invention, the Ln-Pd complex oxide adjacent to the $LnAlO_3$ may suppress decomposition of Ln-Pd complex oxides into Pd metal due to extended exposure to high-temperature. This is attributed to such properties of rare earth elements that greatly vary the configuration depending on the condition of the oxides. For example, when a catalyst of Pd supported on $La_2O_3$ is exposed to higher temperatures, $La_2O_3$ tends to migrate from contacting portions between Pd and $La_2O_3$ onto Pd particles, resulting in a configuration where Pd particles are buried within $La_2O_3$. Alternatively, a phenomenon appears where fine $La_2O_3$ migrates onto the Pd surface (Zhang et al., J. Phys. Chem., Vol. 100, No. 2, 1996, p. 744-754). It is believed that some phenomena similar to those described above occur in the present invention, and thus certain complexation of the rare earth element and the Pd complex oxide on the surface of $LnAlO_3$ may suppress decomposition of Ln-Pd complex oxides into Pd metal due to extended exposure to high-temperature.

The $LnAlO_3$ utilized in the present invention may be prepared through a polymer of an organic acid complex that is synthesized by way of mixing an organic acid to an aqueous solution of nitrate of rare earth elements and evaporating them to dryness. More specifically, $LnAlO_3$ of single phase may be prepared by calcining a polymer of an organic acid complex as a precursor salt at about 800 degrees C. In cases where $LnAlO_3$ is prepared by other processes such as solid-state reaction processes, $LnAlO_3$ of single phase cannot be yielded, even by calcining at about 1700 degrees C. (Adachi Ginya et al., Science of Rare Earth, Kagaku-Dojin Publishing Co., p. 564). That is, $LnAlO_3$ of single phase may be prepared at lower temperatures solely by the process using organic acid. The $LnAlO_3$ prepared by the process may have a sufficient specific surface area and represent a surface condition easily interacting with the Ln-Pd complex oxide.

Ln-Pd Complex Oxide

The catalyst for exhaust gas purification according to the present invention utilizes a Ln-Pd complex oxide that contains a rare earth element and palladium. The Ln-Pd complex oxide may be prepared by a process through a polymer of an organic acid complex in the same way as $LnAlO_3$. The Ln-Pd complex oxide is not particularly limited to being supported on $LnAlO_3$, and may be a mixture thereof. Specific examples of the Ln-Pd complex oxide include $Ln_4PdO_3$, $Ln_2PdO_4$, $Ln_2Pd_2O_5$ etc. Typically, Pd oxides are unstable at higher temperatures, while rare earth oxides are stable. The Pd at the outermost surface of PdO may take two oxidation states, $Pd^{2+}$ and $Pd^0$; among these, $Pd^{2+}$ exhibits higher activity for exhaust gas purification. The Ln-Pd complex oxide is a compound that combines Pd and a rare earth element having these properties; therefore, the oxidation state of Pd is stabilized by the existence of the rare earth element. Accordingly, most Pd among that existing at the surface of Ln-Pd complex oxide exists in the oxidation state $Pd^{2+}$, which makes it possible to maintain the oxidation state preferable for exhaust gas purification.

The decomposition temperature of PdO is usually about 800 degrees C., whereas the Ln-Pd complex oxide can exist stably as an oxide at even higher temperatures of about 1100 degrees C. This is because that Pd, of which the oxide is unstable, combines with rare earth or alkaline earth elements, of which the oxide is stable, thereby strengthening the Pd—O bond in the bulk. Consequently, the catalyst for exhaust gas purification can exhibit excellent thermal resistance and maintain its higher activity for exhaust gas purification at even higher temperatures of about 1100 degrees C.

Furthermore, rare earth elements inherently have lower crystallinity, and thus the Ln-Pd complex oxide includes particles with lower crystallinity. Accordingly, Pd can be dispersed uniformly and entirely on the Ln-Pd complex oxide, which leads to numerous active sites and higher activity for exhaust gas purification.

Rare Earth Oxide

The rare earth oxide, such as $La_2O_3$, intervenes between particles of the Ln-Pd complex oxide. The rare earth oxide may be produced through a polymer of an organic acid complex in a similar way as those of $LnAlO_3$ and the Ln-Pd complex oxide. The rare earth oxide plays a role as a blocking agent that effectively suppresses coagulation of the Ln-Pd complex oxide. In addition, the coexisting $LnAlO_3$ adjacent to these Ln-Pd complex oxides and rare earth oxides may attain a highly dispersed state of Pd, which leads to higher activity for exhaust gas purification and better durability.

The present invention will be explained with reference to the following Examples, but not as to limit the present invention.

EXAMPLE 1

Preparation of Perovskite-Type Complex Oxide

Predetermined amounts of lanthanum nitrate hexahydrate and aluminum nitrate nonahydrate were dissolved into deionized water to prepare an aqueous solution of the mixture. Then, a predetermined amount of malic acid was dissolved into deionized water to prepare an aqueous solution of malic acid. The two aqueous solutions were mixed, and then heated on a hot-plate at 250 degrees C. while being stirred by a stirrer. After evaporating moisture, the mixture was decomposed and dried, and the resulting dry solid was ground in a mortar. The resulting powder was poured into an alumina crucible and heated to 350 degrees C. at a heating rate of 2.5 degrees C./min in a muffle furnace, and then further heated to 350 degrees C. for 3 hours to prepare a calcined material with removing the malic acid salts and nitrates. The calcined material was milled in a mortar for 15 minutes, followed by pouring into the alumina crucible again, heated to 800 degrees C. at a heating rate of 5 degrees C./min in a muffle furnace, and then further heated to 800 degrees C. for 10 hours to prepare a perovskite-type complex oxide, expressed by the general formula $LaAlO_3$ and having a trigonal or rhombohedral crystal system.

Preparation of La—Pd Complex Oxide and $La_2O_3$

Palladium nitrate dihydrate and lanthanum nitrate hexahydrate were dissolved into deionized water in a mole ratio of Pd/La of 1/46 to prepare an aqueous solution of metal salt mixture. Then, a predetermined amount of malic acid was dissolved into deionized water to prepare an aqueous solution of malic acid. The mixture of these two aqueous solutions and a predetermined amount of $LaAlO_3$ powder were poured into an eggplant-shaped flask, the mixture was evaporated and dried in the eggplant-shaped flask, which was immersed in a warm bath at 60 degrees C. and under reduced pressure using a rotary evaporator. Then, the reactant was heated to 250 degrees C. at a heating rate of 2.5 degrees C./min in a muffle furnace, followed by further heating to 750 degrees C. at a heating rate of 5 degrees C./min, and then maintained at 750 degrees C. for three hours. Consequently, a catalyst was prepared in which a mixture of La—Pd complex oxide and $La_2O_3$ was immersed and supported on $LaAlO_3$, and the mole ratio La/Pd (La in $La_2O_3$ to Pd in La—Pd complex oxide) is 42 (hereinafter, expressed by "La—Pd—O(42)/$LaAlO_3$").

EXAMPLES 2 TO 6

The catalysts for exhaust gas purification of Example 2 to 6 were each prepared in a similar manner to Example 1. $LaAlO_3$ having a crystal system of trigonal or rhombohedral was prepared as the perovskite-type complex oxide in Examples 2 to 5. The mole ratio of palladium and lanthanum was varied in the preparation of the La—Pd complex oxides and the rare earth oxides. Specifically, La—Pd—O(16)/$LaAlO_3$ in Example 2, La—Pd—O(8)/$LaAlO_3$ in Example 3 and La—Pd—O(4)/$LaAlO_3$ in Example 4 were prepared. In Example 5, $LaAlO_3$ having a crystal system of trigonal or rhombohedral was prepared as the perovskite-type complex oxide. In addition, Pr—Pd—O(42)/$LaAlO_3$ was prepared in the preparation of the Ln-Pd complex oxide using praseodymium nitrate in place of lanthanum nitrate. Furthermore, in Example 6, NdAlO₃ having a crystal system of trigonal or rhombohedral was prepared in the preparation of perovskite-type complex oxide using neodymium nitrate in place of lanthanum nitrate. In addition, La—Pd—O(42)/NdAlO₃ was prepared through adjusting the mole ratio Pd/La to 1/42 (Pd in La—Pd complex oxide to La in La₂O₃) in the preparation of La—Pd complex oxide and rare earth oxide.

COMPARATIVE EXAMPLE 1

Pd/Al₂O₃

Palladium nitrate dihydrate was dissolved into deionized water to prepare an aqueous solution of metal salt. Then, the solution was poured into an eggplant-shaped flask along with a predetermined amount of Al₂O₃ powder, followed by the mixture being evaporated and dried in a warm bath at 60 degrees C. and under reduced pressure using a rotary evaporator. Then, the reactant was heated to 250 degrees C. at a heating rate of 2.5 degrees C./min in a muffle furnace, followed by further heating to 750 degrees C. at a heating rate of 5 degrees C./min, and then maintained at 750 degrees C. for three hour; thereby a catalyst of Pd/Al₂O₃, in which Pd is supported on Al₂O₃, was prepared.

COMPARATIVE EXAMPLE 2

La—Pd—O(O)/LaAlO₃

La—Pd—O(O)/LaAlO₃ was prepared in a similar manner to Example 1. Specifically, La—Pd—O(O)/LaAlO₃ was prepared through adjusting the mole ratio Pd/La to 1/0 (Pd in La—Pd complex oxide to La in La₂O₃) in the preparation of La—Pd complex oxide and rare earth oxide.

Evaluation

The catalysts of Examples and Comparative Examples were evaluated in terms of activity after endurance treatment. The evaluation was carried out by way of flowing a model exhaust gas through the catalysts in a condition of 14.6 of A/F (corresponding to air/fuel ratio) and 50000 h⁻¹ of SV (space velocity). The endurance treatment was carried out by way of flowing a model exhaust gas of 14.6 of A/F (corresponding to air/fuel ratio) through the catalysts at 980 degrees C. for 20 hours. Table 1 shows the 50% purification temperatures (T50/degrees C.) for HC, CO and NO, and purification rates at 400 degrees C. (η400/%).

Table 1 demonstrates that the catalysts of Examples 1 to 6, each comprising a Ln-Pd complex oxide and a rare earth oxide supported on a perovskite-type complex oxide having a trigonal or rhombohedral crystal system, exhibit higher performance for exhaust gas purification even at lower temperatures and have better durability compared to those of Comparative Examples. FIGS. 4 to 9 show relations, based on the evaluation results shown in Table 1, between the mole ration of rare earth element to palladium in the La—Pd complex oxides and 50% purification temperatures for HC, CO and NO, or purification rates at 400 degrees C. It is confirmed, as shown in FIGS. 4 to 9, that as the mole ratio of the rare earth element in the rare earth oxide to palladium in the La—Pd complex oxides increases, the 50% purification temperatures decrease, and also that the purification rates at 400 degrees C. rise with respect to NO, CO and HC.

Figure 10:
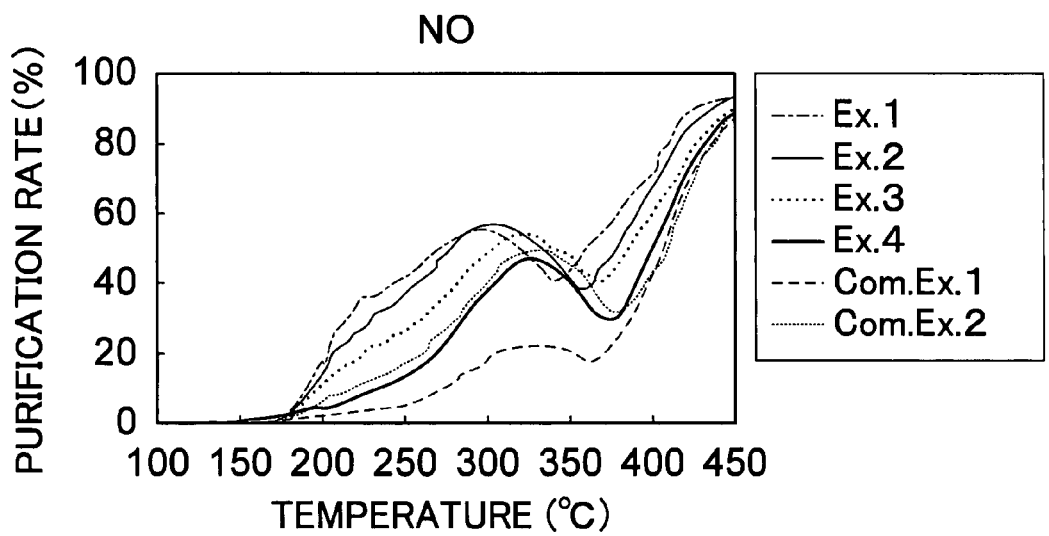
FIG. 10 is a graph that shows a relation between temperature and NO purification rate.
Figure 11:
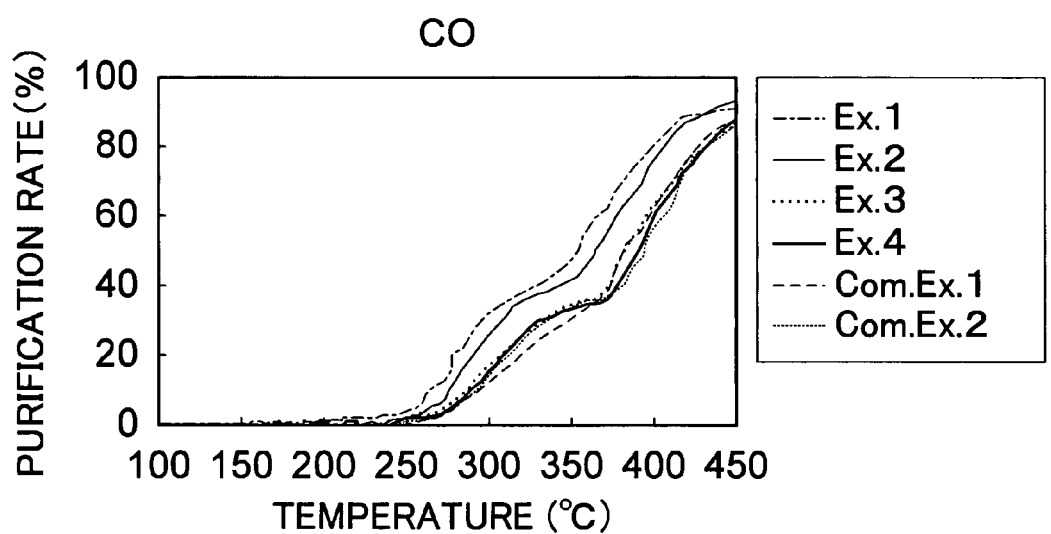
FIG. 11 is a graph that shows a relation between temperature and CO purification rate.
Figure 12:
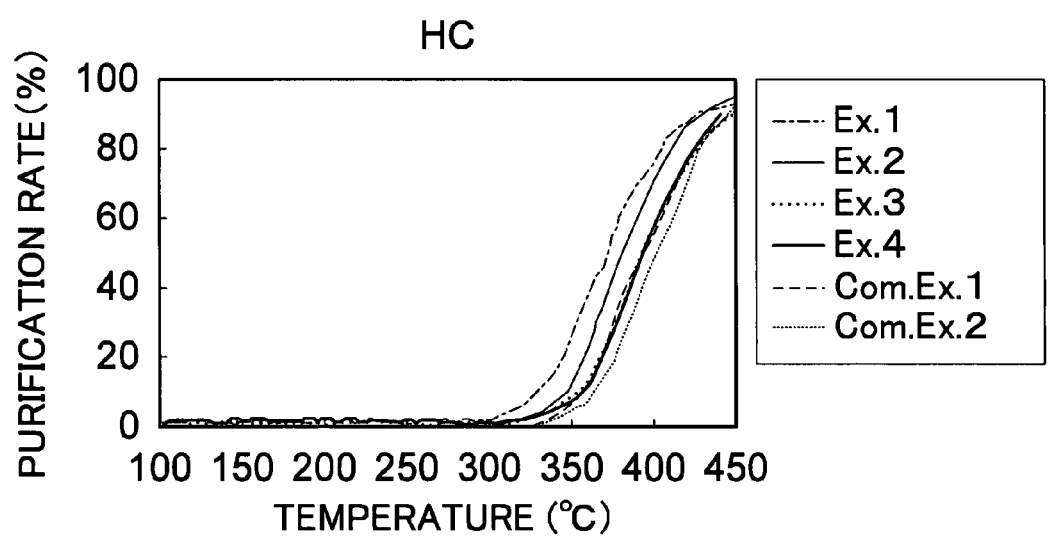
FIG. 12 is a graph that shows a relation between temperature and HC purification rate.

FIGS. 10 to 12 each represent a relation of temperature and purification rate under a temperature-rising condition based on data of Examples 1 to 4 and Comparative Examples. These FIGs. demonstrate that Examples represent higher purification rates than Comparative Examples with respect to NO, CO and HC.

INDUSTRIAL APPLICABILITY

The present invention can provide catalysts for exhaust gas purification that can not only efficiently and simultaneously purify nitrogen oxides, hydrocarbons and carbon monoxide in exhaust gases emitted from internal combustion engines such as those of automobiles even at lower temperatures, but also exhibit excellent durability.

The invention claimed is:

1. A catalyst for exhaust gas purification, suited to purify nitrogen oxides, hydrocarbons and carbon monoxide in the exhaust gas,
    wherein a complex oxide, a rare earth oxide and a perovskite-type complex oxide coexist in the catalyst,
    the complex oxide consists of a rare earth element and palladium,
    the perovskite-type complex oxide is expressed by the general formula LnAlO₃,
    wherein Ln is a rare earth element; and
    wherein the complex oxide consisting of a rare earth element and palladium, the rare earth oxide, and the perovskite-type complex oxide are each produced through a polymer of an organic acid complex comprising a rare-earth metal and an organic acid.

2. The catalyst for exhaust gas purification according to claim 1, wherein a crystal system of the perovskite-type complex oxide expressed by the general formula LnAlO₃ is a trigonal crystal system.

TABLE 1

| | | T50/degrees C. | | | η400/% | | |
|---|---|---|---|---|---|---|---|
| Sample | Catalyst | HC | CO | NO | HC | CO | NO |
| Ex. 1 | La—Pd—O(42)/LaAlO₃ | 371 | 350 | 271 | 75.5 | 80.9 | 72.9 |
| Ex. 2 | La—Pd—O(16)/LaAlO₃ | 377 | 361 | 267 | 74.3 | 76.9 | 74.1 |
| Ex. 3 | La—Pd—O(8)/LaAlO₃ | 393 | 380 | 301 | 57.6 | 64.1 | 60.8 |
| Ex. 4 | La—Pd—O(4)/LaAlO₃ | 394 | 386 | 399 | 58.3 | 61.2 | 50.3 |
| Ex. 5 | Pr—Pd—O(42)/LaAlO₃ | 359 | 337 | 255 | 75.7 | 80.8 | 74.4 |
| Ex. 6 | La—Pd—O(42)/NdAlO₃ | 358 | 335 | 261 | 81.1 | 85.2 | 83.1 |
| Com. Ex. 1 | Pd/Al₂O₃ | 395 | 379 | 405 | 55.1 | 63.0 | 42.0 |
| Com. Ex. 2 | La—Pd—O(0)/LaAlO₃ | 396 | 388 | 404 | 54.5 | 57.9 | 43.8 |

3. The catalyst for exhaust gas purification according to claim 1, wherein the organic acid is a carboxylic acid, with a carbon number of no less than 1 and no more than 20, that includes a group selected from a hydroxyl group and a mercapto group.

4. The catalyst for exhaust gas purification according to claim 1, wherein the mole ratio of the rare earth element in the rare earth oxide to palladium in the complex oxide consisting of a rare earth element and palladium (rare earth element/palladium) is more than 0 and no more than 42.

5. The catalyst for exhaust gas purification according to claim 1, wherein the complex oxide consisting of a rare earth element and palladium as well as the rare earth oxide are supported on the perovskite-type complex oxide expressed by the general formula.

6. An apparatus for exhaust gas purification, comprising a catalyst for exhaust gas purification according to claim 1.

* * * * *